(12) United States Patent
Nakamura (10) Patent No.: US 6,276,415 B1
(45) Date of Patent: Aug. 21, 2001

(54) PNEUMATIC RADIAL TIRE FOR MOTORCYCLE

(75) Inventor: Tsutomu Nakamura, Tokorozawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/226,127

(22) Filed: Jan. 7, 1999

(30) Foreign Application Priority Data

| Jan. 7, 1998 | (JP) | ................................................. 10-001434 |
| Jun. 17, 1998 | (JP) | ................................................. 10-169832 |
| Jun. 17, 1998 | (JP) | ................................................. 10-169833 |

(51) Int. Cl.[7] .................. B60C 11/113; B60C 115/00; B60C 123/00; B60C 9/20
(52) U.S. Cl. ............................ 152/209.11; 152/209.17; 152/209.28; 152/454; 152/531
(58) Field of Search .................. 152/209.8, 209.11, 152/209.17, 209.28, 454, 531

(56) References Cited

U.S. PATENT DOCUMENTS

| D. 287,955 | * | 1/1987 | Hayakawa et al. .................. D12/147 |
| 4,289,182 | | 9/1981 | Sato et al. . |
| 4,311,179 | * | 1/1982 | Hayakawa et al. ............. 152/209.11 |
| 4,364,426 | * | 12/1982 | Mills et al. ...................... 152/209.11 |
| 4,606,389 | | 8/1986 | Haas . |
| 5,975,175 | * | 11/1999 | Armellin .......................... 152/209.11 |

FOREIGN PATENT DOCUMENTS

| 203889 | * | 6/1959 | (AT) ..................................... 152/531 |
| 2114069 | * | 8/1983 | (GB) .............................. 152/209.11 |
| 63-121505 | * | 5/1988 | (JP) ................................ 152/209.11 |
| 2-306802 | * | 12/1990 | (JP) ................................ 152/209.11 |
| 8-169211 | * | 7/1996 | (JP) ................................ 152/209.11 |

OTHER PUBLICATIONS

Cycle World, Vance & Hines advertisement (one page) Oct. 1989.*
Patent Abstracts of Japan, V 15, N89 (M–1088), Dec. 20, 1990, (JP 02306802).
Patent Abstracts of Japan, V1996, N11, Jul. 2, 1996 (JP 08169211).

* cited by examiner

*Primary Examiner*—Steven D. Maki
(74) *Attorney, Agent, or Firm*—Sughrue, Mion, Zinn, Macpeak & Seas, PLLC

(57) ABSTRACT

A pneumatic radial tire for motorcycle comprises a belt containing cords extended substantially in a circumferential direction of a tread and has a directional tread pattern defined by plural main slant grooves having a given inclination angle with respect to the circumferential direction and extending from a tread center up to a tread shoulder region and a slant sub-groove arranged between the slant main grooves and having an inclination angle smaller than that of the slant main groove, in which the slant main groove has a given width in connection with a periphery length between both ends of the tread at a particular posture under a given air pressure; a main portion of the slant sub-groove is terminated so as not to open into the slant main groove and has given groove width, length in the circumferential direction of the tread, and depth.

25 Claims, 10 Drawing Sheets

FIG_1
PRIOR ART

FIG_2
PRIOR ART

FIG_3

FIG_4

FIG.7a
*Comparative*

FIG.7b
*Comparative*

FIG_8a

Rotating direction

FIG_8b

FIG_9a

FIG_9b

FIG_10a
Comparative

FIG_10b
Comparative

FIG_11a

FIG_11b

PNEUMATIC RADIAL TIRE FOR MOTORCYCLE

BACKGROUND OF THE INVENTION

1. Field of the Invention

This invention relates to a pneumatic radial tire for motorcycle, and more particularly to a pneumatic radial tire for use in a front wheel of a motorcycle simultaneously establishing excellent durability and steering stability by a proper combination of a tread pattern and a belt structure.

2. Description of Related Art

Figure 1:
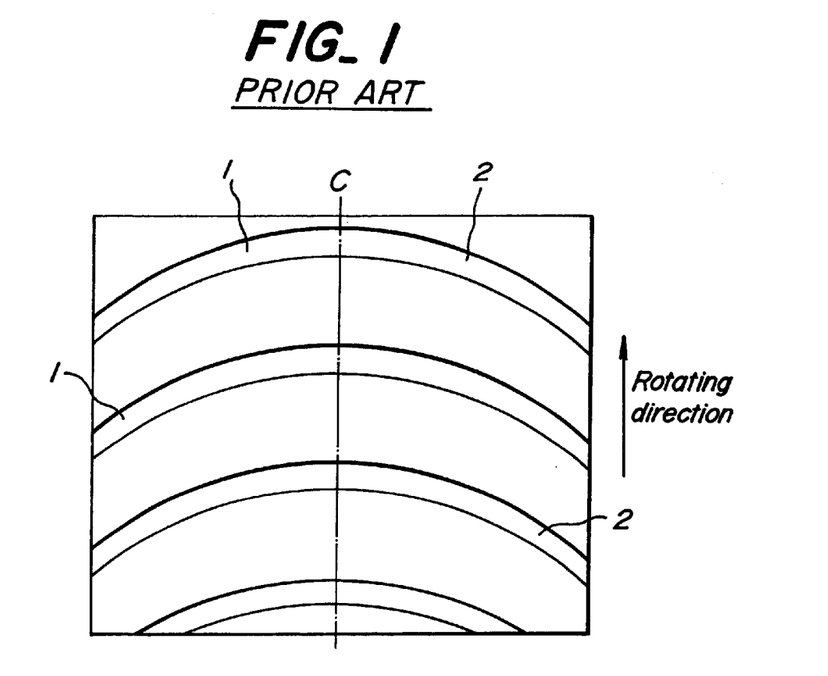
FIG. 1 is a schematically developed view of a tread pattern in the conventional tire.

This type of the conventional tire comprises a belt containing cords extended substantially in a circumferential direction of a tread and has a directional tread pattern defined by main slant grooves each having an acute-side inclination angle of not less than 45° with respect to the circumferential direction of the tread and extending from a tread center up to a tread shoulder region. The tread pattern has main slant grooves 1, 2 convexly curing toward a rotating direction of the tire on both sides of a tread center C which are arranged symmetrically with respect to the tread center C as shown in FIG. 1.

In such a tire and hence such a tread pattern, there is a problem that shimmy is liable to be particularly caused in a front wheel tire due to a fact that the bending rigidity of the tread is high in a meridional section of the tire. Also, circumferential components of the main slant grooves 1, 2 are less, so that there are problems that drainage performance on wet road, resistance to lateral slipping and the like are low and a high gripping force on wet road surface can not be developed.

On the contrary, if it is intended to adjust the bending rigidity of the tread by arranging circumferential grooves continuing straightforward in the circumferential direction of the tread on a ground contact region of the tread in addition to the main slant grooves 1, 2, the drainage performance on wet road can be enhanced while controlling the occurrence of shimmy. However, since the cords in the belt substantially extend in the circumferential direction of the tread, the bending resistance at the bottom of the circumferential groove becomes small and hence there is a problem that cracking at the groove bottom is created at a relatively premature stage.

Figure 2:
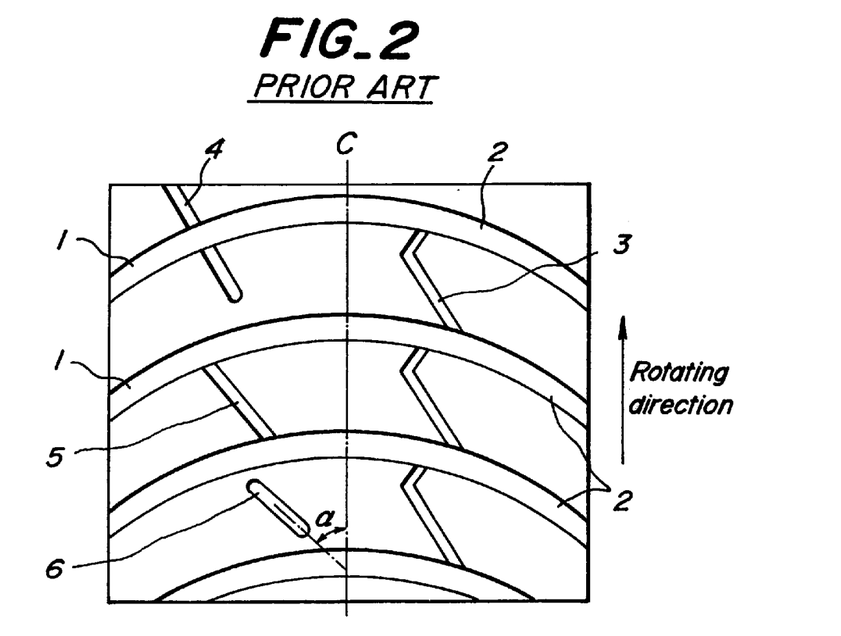
FIG. 2 is a schematically developed view of a tread pattern in the other conventional tires.

As partly and collectively shown in FIG. 2, therefore, there are proposed patterns in one wherein circumferential zigzag grooves 3 continuously extending zigzag in the circumferential direction of the tread are arranged on the ground contact region of the tread in addition to the main slant grooves 1, 2. In another pattern slant sub-grooves 4 or 5 are arranged to extend straightforward and intersect with the main slant groove 1, 2 or open to the main slant grooves 1, 2. In another pattern slant sub-grooves 6 extend straightforward between the main slant grooves 1, 2 so as not to communicate therewith and have a large inclination angle α of more than 30° with respect to the circumferential direction of the tread.

According to these patterns, the control of shimmy and the improvement of drainage performance on wet road are generally attained owing to the presence of the circumferential zigzag groove 3, or slant sub-groove 4, 5 or 6.

However, when the circumferential zigzag groove 3 is arranged to continuously extend in the circumferential direction of the tread, there is an improving effect as compared with the straight groove, but the rigidity is lowered too much to degrade the stability and the steering property.

When the slant sub-grooves 4, 5 are arranged to intersect with or open to the slant main grooves 1, 2, the rigidity is lower than that of the circumferential zigzag groove 3 and the stability and the steering property are further degraded.

Even in both cases, the occurrence of cracking at the bottom of the zigzag groove 3 or the sub-groove 4 or 5 can not sufficiently be prevented.

When the slant sub-grooves 6 having an inclination angle α of more than 30° with respect to the circumferential direction of the tread are arranged between the slant main grooves 1, 2, the drainage performance on a wet road can not be improved to an expected extent. Also, the component of the sub-groove 6 in the circumferential direction of the tread is less and the length of groove edge in the circumferential direction of the tread is short, so that there is a problem that the resistance to lateral slipping in the tire can not be enhanced to an expected extent.

SUMMARY OF THE INVENTION

It is, therefore, an object of the invention to solve the aforementioned problems of the conventional technique and to provide a pneumatic radial tire for a motorcycle which prevents the occurrence of shimmy and sufficiently enhances the resistance to lateral slipping to improve the steering stability on wet road surface while ensuring the excellent drainage performance on wet road and effectively prevents the occurrence of cracking at the groove bottom to advantageously enhance the tread durability.

It is another object of the invention to provide a pneumatic radial tire for a motorcycle capable of enhancing a rigidity balance at meridional section of the tire to further effectively prevent the occurrence of cracking at the groove bottom and realize the bending rigidity of the tread effective for reducing cornering power to a handle shimmy and balancing a quick handling in the application of a camber angle and a linearity in a change of steering force required therefor by an adequate combination of tread pattern and belt structure.

According to the invention, there is the provision of a pneumatic radial tire for motorcycle comprising a belt containing cords extended substantially in a circumferential direction of a tread and having a directional tread pattern defined by main slant grooves each having an acute-side inclination angle of not less than 45° with respect to the circumferential direction of the tread and extending from a tread center or a vicinity thereof up to a tread shoulder region and a slant sub-groove extending between the slant main grooves and having an acute-side inclination angle with respect to the circumferential direction of the tread smaller than that of the slant main groove, in which a groove width of the slant main groove is within a range of 3–15% of a periphery length between both ends of the tread when the tire is mounted onto a standard rim and inflated with an air pressure corresponding to 80% of a maximum air pressure with no loading; a main portion of the slant sub-groove having at least one of a width and a depth larger than that of the other portion is terminated so as not to open into the slant main groove; the main portion has an acute-side inclination angle of 0–30° with respect to the circumferential direction of the tread, a groove width narrower than that of the slant main groove, a length in the circumferential direction of the tread corresponding to 30–80% of an arranging pitch of the slant main groove, and a depth corresponding to 50–100% of a depth of the slant main groove.

In the invention, the slant sub-groove may be disposed on a center of the tread, in which the slant sub-groove is extended between two pairs of slant main grooves, each pair of which communicating with each other at the tread center.

Moreover, the term "main portion of the slant sub-groove" used herein means a width-wider portion or a depth-deeper portion when the slant sub-groove has at least one of narrow-wide groove width and shallow-deep groove depth. When both the groove width and the groove depth are constant, the whole of the slant sub-groove is a main portion.

When a portion having a narrow groove width and a deep groove depth and a portion having a wide groove width and a shallow groove depth are mixed together in the one slant sub-groove, the main portion means the portion having a deep groove depth. On the other hand, when a plurality of portions having a wide groove width or a deep groove depth are existent in the one slant sub-groove, these plural portions correspond to the main portion of the slant sub-groove, in which the length of the main portion is a total length of these plural portions.

The above definition on the main portion of the slant sub-groove is applied to a case that plural slant sub-groove portions are extended at given intervals between the slant main grooves in a straight line.

In the pneumatic radial tire according to the invention, the high-speed durability, steering stability on dry road surface and the like can be enhanced by helically winding one cord or plural cords as a belt cord to extend substantially in the circumferential direction of the tread. Also, when the acute-side inclination angle of the slant main groove with respect to the circumferential direction of the tread is not less than 45°, the drainage in a lateral direction is attained smoothly and rapidly and also excellent traction and braking performances are attained, and further the bending rigidity at the section in the widthwise direction is ensured to provide an excellent gripping force in the cornering on dry road surface.

Furthermore, the groove width of the slant main groove is within a range of 3–15% of the periphery length between both ends of the tread, so that the bending rigidity of the tread in an equatorial section of the tire or in a sectional plane parallel thereto is moderately decreased to properly increase the length and width of the ground contact region. Consequently, excellent gripping force on dry and wet roads, controllability in the slipping, stability can be obtained and also sufficient drainage can be attained. That is, when the groove width is less than 3%, the bending rigidity of the tread can not effectively be decreased and sufficient drainage can not be ensured and hence the gripping force, controllability in the slipping, stability and the gripping property on wet road are insufficient. When it exceeds 15%, the bending rigidity of the tread is decreased too much and hence the gripping stability on dry road can not sufficiently be ensured.

The reason why the groove width of the slant main groove is specified by the periphery length at a posture of the tire inflated under an air pressure corresponding to 80% of a maximum air pressure with no loading is based on the fact that considering a case of defining the groove width in accordance with the tire size, the ground contact width substantially changes in proportion to the periphery length and hence it is adequate and simple to represent the width of the slant main groove effectively acting in the ground contact region by a ratio to the periphery length.

Moreover, the main portion of the slant sub-groove is terminated so as not to open into the slant main groove and the acute-side inclination angle of the main portion with respect to the circumferential direction of the tread is within a range of 0–30°. Also, the arranging method and size of the slant sub-groove such as width and depth of the main portion and the like are optimized totally and balancedly, whereby the drainage performance on wet road is enhanced and the bending rigidity of the tread at the meridional section of the tire is properly maintained to advantageously improve the resistance to cracking at the groove bottom and the length of the groove edge effective to lateral input is sufficiently maintained to bring about a high resistance to lateral slipping force. In addition, the slant sub-groove may be arranged in a position particularly effective for lowering the cornering power to the handle shimmy or in the ground contact region in straight running.

As a result, the lateral gripping force on wet road surface can be increased and also the stiffness feeling required in the running on dry road surface can be produced. Furthermore, the quick handling and stability are sufficiently rationalized and particularly the occurrence of shimmy can effectively be controlled in the front tire.

When the inclination angle of the main portion exceeds 30°, the drainage performance is degraded and there is a fear of decreasing the lateral gripping force on wet road surface or the resistance to lateral slipping.

Also, the steering stability and the wear resistance can effectively be ensured by making the groove width of the main portion narrower than that of the slant main groove. If the groove width of the main portion is wider than that of the slant main groove, the bending rigidity of the tread is extremely decreased to cause a fear of damaging the steering stability and also the ground contact area is decreased to degrade the wear resistance.

Furthermore, when the length of the main portion in the circumferential direction of the tread is within a range of 30–80% of the arranging pitch of the slant main groove, the steering stability can more sufficiently be enhanced while maintaining the high drainage performance on wet road, resistance to lateral slipping and the like. When the length of the main portion is less than 30%, it is difficult to sufficiently develop the effect by the arrangement of the slant sub-groove. When it exceeds 80%, the bending rigidity of the tread at the meridional section of the tire is too low, the degradation of the steering stability can not be avoided.

Moreover, when the depth of the main portion is 50–100% of the depth of the slant main groove, more excellent drainage performance on wet road is guaranteed. When the depth is less than 50%, it tends to lack the drainage performance on wet road, while when it exceeds 100%, the thickness of the tread from the groove bottom toward the inside is too thin and a fear of causing puncture by a nail or the like becomes high.

In the pneumatic radial tire according to the invention, when an arranging density of the cords in the belt is made higher in a tread shoulder zone than in a tread center zone and a total length of the slant main groove and the slant sub-groove in the circumferential direction of the tread is made longer in the tread shoulder zone than in the tread center zone, or when an arranging density of the cords in the belt is made higher in the tread center zone than in the tread shoulder zone and a total length of the slant main groove and the slant sub-groove is made longer in the tread center zone than in the tread shoulder zone, the bending rigidity of the tread at the meridional section thereof can further sufficiently be ensured to advantageously improve the resistance to cracking at the groove bottom. Also, the length of the groove edge effective to the lateral input can more sufficiently be ensured. Additionally, the bending rigidity of the tread at the meridional section suitable for lowering the cornering power to the handle shimmy can be obtained by the proper combination of the arranging density distribution of the cords in the belt and the arranging form of the slant sub-groove as mentioned above, and further the bending rigidity distribution suitable for ensuring the steering stability can be obtained.

Therefore, it is possible to more effectively balance the aforementioned effects with respect to the lateral gripping force on wet road surface, the stiffness feeling on dry road surface and the like.

In this case, the term "tread center zone" used herein means a zone ranging from the tread center to a position corresponding to about ¼ of the above-mentioned peripheral length located on both sides of the tread center. Therefore, the tread shoulder zone means a zone located outside the tread center zone.

Under the condition that the arranging density of the cords in the belt is made higher in the tread shoulder zone than in the tread center zone, if the total length of the slant main groove and the slant sub-groove in the circumferential direction of the tread is the same between the tread shoulder zone and the tread center zone or is longer in the tread center zone, it is liable to cause the cracking at groove bottom in a portion of the tread center zone having a low bending rigidity at the meridional section. Also, the rigidity in the straight running is decreased to degrade the quick handling and further the linearity of the rigidity in the application of camber angle is lowered to damage the linearity in the steering force.

On the other hand, under the condition of arranging density of the cords in the belt higher in the tread center zone than in the tread shoulder zone, if the total length of the slant main groove and the slant sub-groove is the same between the tread center zone and the tread shoulder zone or longer in the tread shoulder zone, it is liable to cause the cracking at the groove bottom in a portion of the tread center zone having a low bending rigidity at the meridional section and also the rigidity in the straight running is increased to degrade the straight running stability and it is liable to cause the shimmy. Moreover, the rigidity in the application of a camber angle at the ground contact region is decreased to lower camber thrust to thereby lower the cornering power.

BRIEF DESCRIPTION OF THE DRAWINGS

The invention will be described with reference to the accompanying drawings, wherein.

DESCRIPTION OF THE PREFERRED EMBODIMENTS

Figure 3:
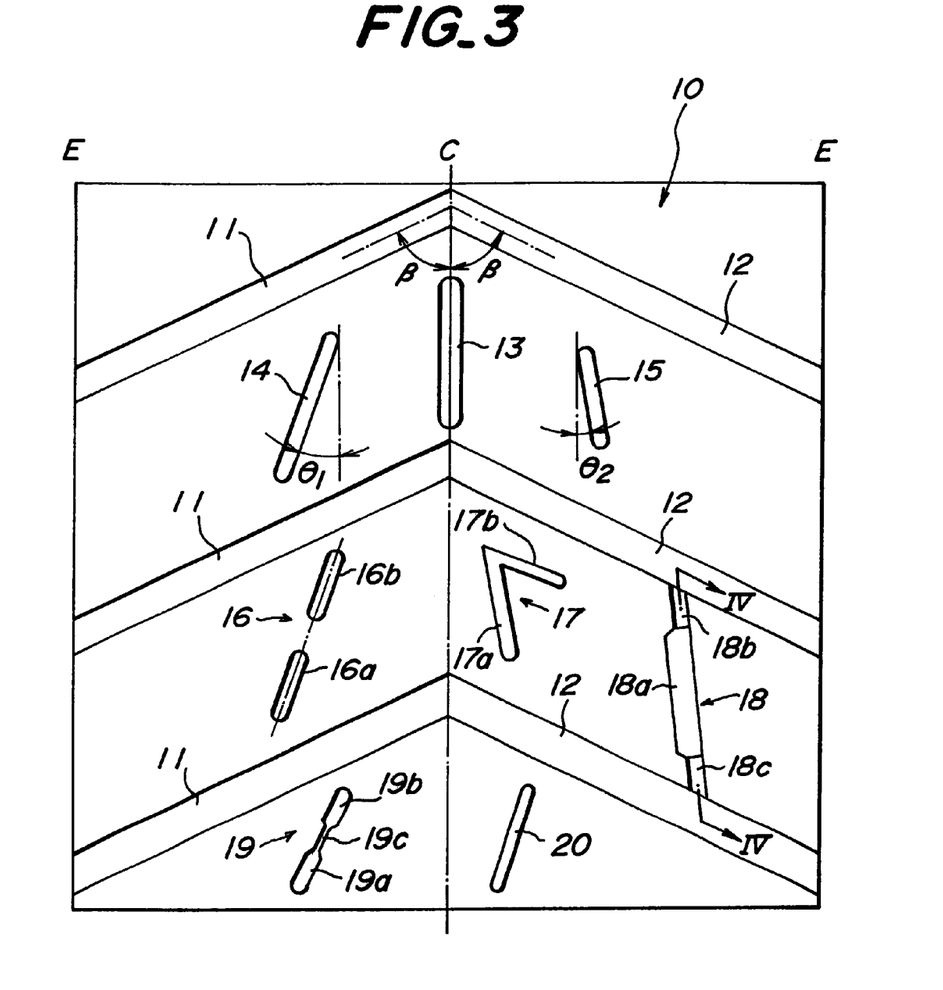
FIG. 3 is a schematically developed view of a tread pattern illustrating an embodiment of the invention together with plural kinds of slant sub-grooves.

In FIG. 3 is shown a schematically developed view of a tread pattern partly and collectively illustrating eight kinds of slant sub-grooves as an embodiment of the invention. In general, each kind of the slant sub-grooves is disposed in symmetry with respect to a tread center C and at an equal pitch in a circumferential direction of the tread.

In the illustrated embodiment, slant main grooves 11, 12 having an acute-side inclination angle $\beta$ of not less than 45° with respect to the circumferential direction of the tread are arranged on a ground contact surface 10 of the tread so as to extend straightforward from the tread center C to an end E of the tread and position in symmetry with respect to the tread center C.

Each of the slant main grooves 11, 12 has a groove width corresponding to 3–15% of a periphery length between both tread ends when the tire is mounted onto a standard rim and inflated under an air pressure corresponding to 80% of a maximum air pressure with no loading.

A first embodiment of the slant sub-groove to be formed between the slant main grooves is positioned on the tread center C and terminated so as not to open into both the slant main grooves as shown by numeral 13 in FIG. 3. This slant sub-groove 13 has constant width and depth over a full length thereof. Therefore, the slant sub-groove 13 has an acute-side inclination angle of 0° with respect to the circumferential direction of the tread and forms a main portion as a whole.

In this case, the slant sub-groove 13 has a groove width narrower than that of the slant main groove 11, 12, a length in the circumferential direction of the tread corresponding to 30–80% of an arranging pitch of the slant main groove 11, 12, and a depth corresponding to 50–100% of the depth of the slant main groove 11, 12.

Although the slant sub-groove 13 extends in the same direction as cords in a belt located beneath the tread, it is discontinous to the slant main grooves 11, 12, so that a discontinuous portion between the slant main groove and the slant sub-groove serves to maintain the rigidity of the tread at a sufficiently high level against bending deformation at a meridional section of the tire and hence the occurrence of cracking at the bottom of the slant sub-groove 13 is sufficiently obstructed. Also, the slant sub-groove 13 extending in the circumferential direction of the tread can produce excellent drainage performance on wet road and high resistance to lateral slipping on wet road surface at its groove edge.

In FIG. 3, numerals 14, 15 show second and third embodiments of the slant sub-groove according to the invention, respectively. Each of these slant sub-grooves 14, 15 is disposed on each side of the tread center C so as to extend in the same inclining direction as the slant main groove 11, 12, in which acute-side inclination angles $\theta_1$, $\theta_2$ with respect to the circumferential direction of the tread are within a range of 0–30°, respectively.

Although the length in the circumferential direction of the tread is longer in the slant sub-groove 14 than in the slant sub-groove 15, such lengths of these slant sub-grooves 14, 15 sufficiently satisfy the range described in the above first embodiment. And also, they have the same groove width and depth as mentioned above.

A fourth embodiment of the slant sub-groove shown by numeral 16 is comprised of two sub-groove portions 16a, 16b located on the same line at a given interval. In this case, both sub-groove portions 16a, 16b form a main portion of the slant sub-groove 16. Therefore, the length of the main portion in the circumferential direction of the tread is a component of a total length of these sub-groove portions 16a, 16b in the circumferential direction of the tread.

A fifth embodiment of the slant sub-groove shown by numeral 17 is comprised of a wide-width portion 17a inclining in the same direction as in the slant main groove 12 and a narrow-width folded portion 17b extending from an end of the portion 17a in a rotating direction of the tire in substantially parallel to the slant main groove 12 toward a side of the tread end E. In this case, the portion 17a forms a main portion satisfying all of the conditions as mentioned above.

Figure 4:
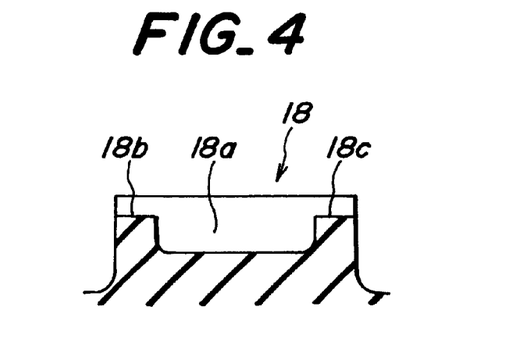
FIG. 4 is a section view taken along a line IV—IV of FIG. 3.

A sixth embodiment of the slant sub-groove shown by numeral 18 is comprised of a main portion 18a having a wide groove width as shown in FIG. 3 and a deep groove depth as sectional shown in FIG. 4, and straight portions 18b, 18c extending outward from both ends of the main portions 18a in the rotating direction of the tire to open into the respective slant main grooves 12 and having a narrow groove width and a shallow groove depth. In this case, the main portion 18a satisfies all of the conditions as mentioned above.

A seventh embodiment of the slant sub-groove shown by numeral 19 is comprised of sub-groove portions 19a, 19b similar to the sub-groove portions 16a, 16b of the fourth embodiment and a narrow-width middle portion 19c connecting these portions 19a, 19b to each other. In this case, the sub-groove portions 19a and 19b form a main portion, but the middle portion 19c does not constitute the main portion.

An eighth embodiment of the slant sub-groove shown by numeral 20 is inclined in a direction opposite to the inclining direction of the slant main groove 12.

Although the slant sub-groove is described with respect to the above various embodiments, when at least one kind of the above embodiments as the slant sub-groove is regularly formed on the ground contact region of the tread, high drainage performance on wet road and resistance to lateral slipping are attained and the occurrence of cracking at the bottom of the slant sub-groove is prevented as previously mentioned, whereby the tread durability can largely be improved.

Figure 5:
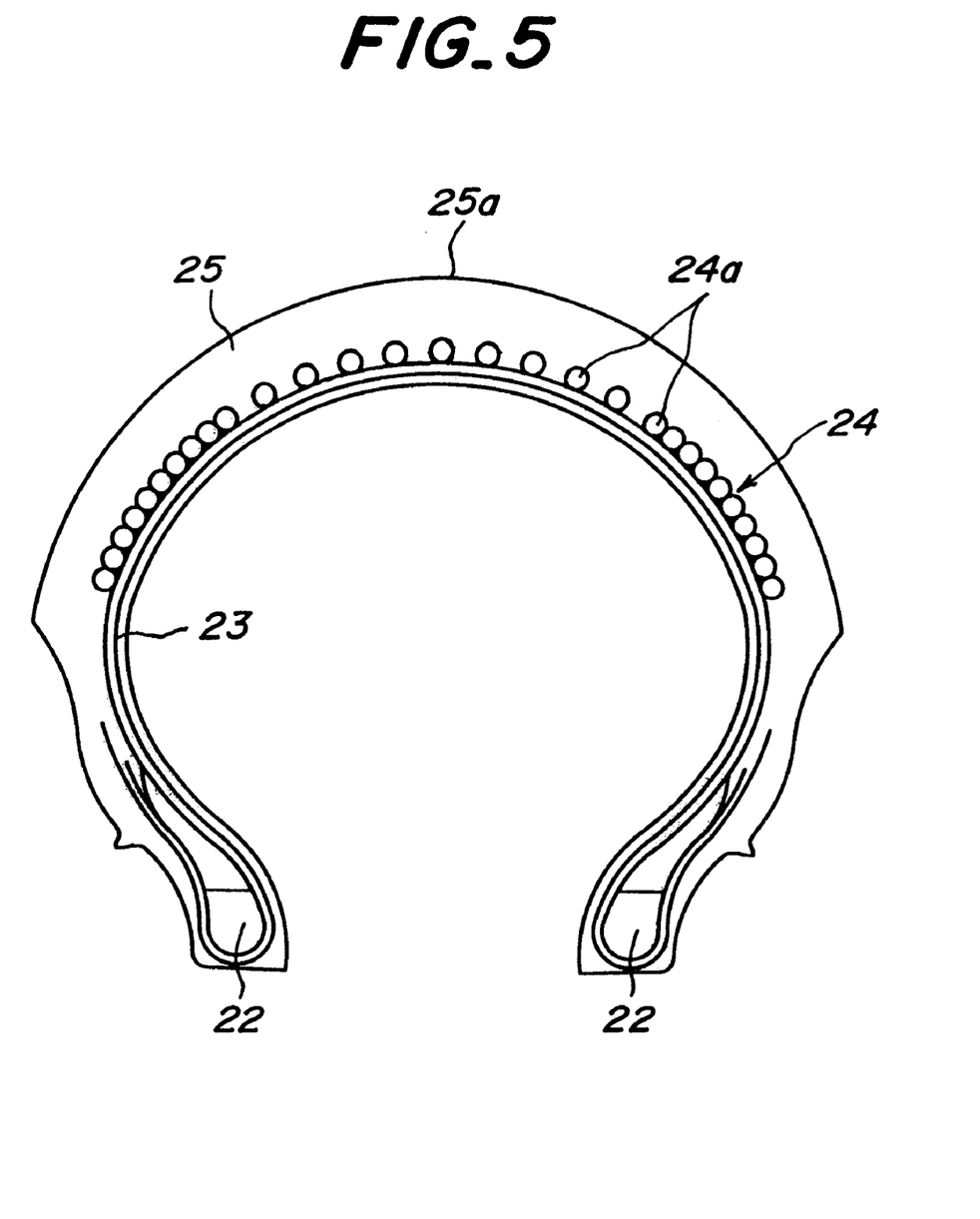
FIG. 5 is a meridional section view of the pneumatic radial tire according to the invention illustrating an embodiment of the belt structure.

In FIG. 5 is shown a meridional section of a first embodiment of the pneumatic radial tire according to the invention illustrating a preferable embodiment of the belt structure, in which numeral 22 is a bead core, numeral 23 a radial carcass toroidally extending between the bead cores 22 and wound around the bead core 22 from inside toward outside to form a turnup portion.

On an outer peripheral side of a crown portion of the radial carcass 23 are a belt 24 and a tread 25 in this order. The belt 24 is constituted by helically winding a cord 24a for the belt to extend substantially in the circumferential direction of the tread. In this case, the arranging density of the cords 24a is higher in a tread shoulder zone than in a tread center zone as shown in FIG. 5, and also a total length of slant main grooves (11, 12) and slant sub-grooves (one of the first to eighth embodiments as mentioned above) is longer in the tread shoulder zone than in the tread center zone.

Figure 6:
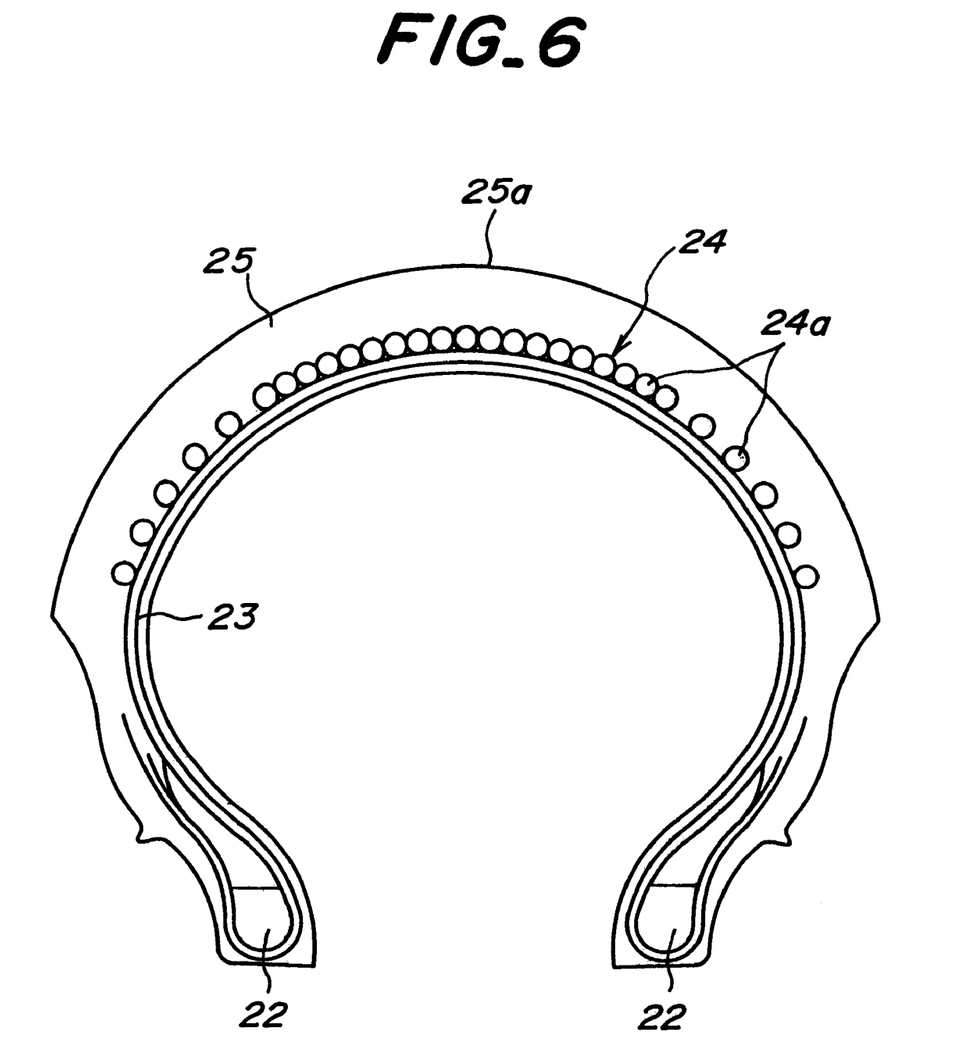
FIG. 6 is a meridional section view of the pneumatic radial tire according to the invention illustrating another embodiment of the belt structure.

In FIG. 6 is shown a meridional section of a second embodiment of the pneumatic radial tire according to the invention illustrating another preferable embodiment of the belt structure. In this case, the arranging density of the cords 24a is higher in the tread center zone than in the tread shoulder zone as shown in FIG. 6, and also the total length of slant main grooves (11, 12) and slant sub-grooves (one of the first to eighth embodiments as mentioned above) is longer in the tread center zone than in the tread shoulder zone.

By combining the belt structure as shown in FIGS. 5 and 6 with the slant main groove and the slant sub-groove as defined above can effectively and balancedly be developed the effects such as lateral gripping force on wet road surface, stiffness feeling on dry road surface, quick handling, stability, control of shimmy and the like.

The following examples are given in illustration of the invention and are not intended as limitations thereof.

EXAMPLES 1–3

There are provided three pneumatic radial tires each having a tire size of 120/70ZR17 and a tread pattern (FIG. 3) defined by slant main grooves 11, 12 having an acute-side inclination angle $\beta$ of 60° with respect to a circumferential direction of a tread and slant sub-grooves, in which the slant main groove and slant-sub-groove have various sizes as shown in table 1. Each of these tires is inflated to an air pressure of 2.5 kg/cm² and is mounted onto a front wheel of a motorcycle and actually run on road to conduct feeling evaluation with respect to the steering property, stability, gripping property on wet road surface and the like, and the resistance to cracking at a bottom of the slant-sub-groove is measured by a drum test. These results are shown in Table 2.

TABLE 1

|  | Width of slant main groove (mm) | Distance of land portion between slant main grooves in circumferential direction of tread (mm) | Slant sub-groove | | |
|---|---|---|---|---|---|
|  |  |  | width (mm) | length in circumferential direction (mm) | inclination angle with respect to circumferential direction |
| Example 1 | 4 | 21 | 2 | 15 | 20° |
| Example 2 | 4 | 27 | 2 | 21 | 25° |
| Example 3 | 4 | 25 | 3.8 | 10 | 0° |

TABLE 2

|  | Conventional Example 1 | Conventional Example 2 | Example 1 | Example 2 | Example 3 |
|---|---|---|---|---|---|
| Dry road surface |  |  |  |  |  |
| stability (stiffness feeling) | 100 | 90 | 95 | 100 | 100 |
| quick handling | 100 | 80 | 95 | 100 | 100 |
| handle shimmy | 100 | 120 | 120 | 110 | 105 |

TABLE 2-continued

|  | Con- ventional Example 1 | Con- ventional Example 2 | Example 1 | Example 2 | Example 3 |
|---|---|---|---|---|---|
| Gripping property on wet road | 100 | 120 | 115 | 105 | 105 |
| Resistance to cracking at groove bottom | no trouble after running over 20,000 km | occurrence of cracking in running over 10,000 km | no trouble after running over 20,000 km | no trouble after running over 20,000 km | no trouble after running over 20,000 km |

Note)
The larger the index value by actual feeling test, the better the feeling evaluation.

In Table 2, the conventional tire 1 has a tread pattern shown in FIG. 1, and the conventional tire 2 has a tread pattern shown in FIG. 2 except that sub-groove extends zigzag in the circumferential direction and connects the slant main grooves to each other and has a width corresponding to 80% of the width of the slant main groove and a depth equal to that of the slant main groove.

EXAMPLES 4–5

Comparative Example 1

There are provided three pneumatic radial tires having a tire size of 120/70ZR17 for a front wheel of a motorcycle as Comparative Example 1 and Examples 4, 5. The same actual running test and drum test as in Example 1 are carried out to obtain results as shown in Table 3.

Figure 7A:
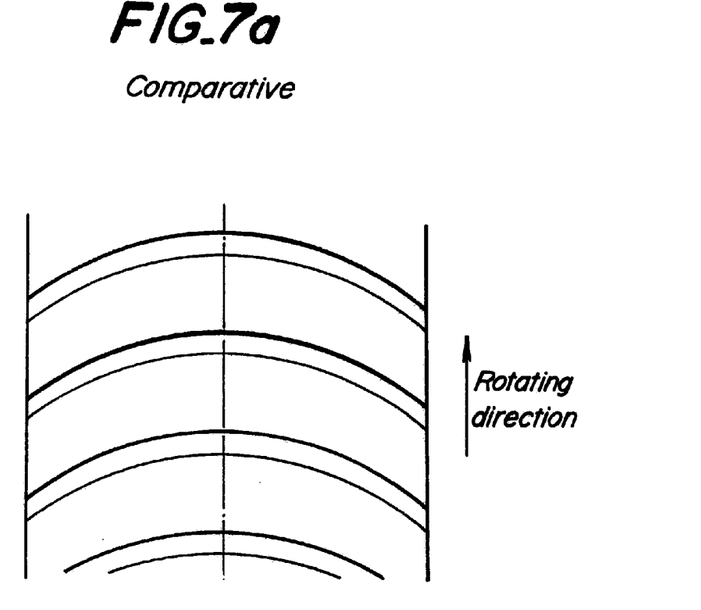
FIGS. 7a and 7b are schematic views illustrating a tread pattern and a belt structure of a comparative tire, respectively.
Figure 7B:
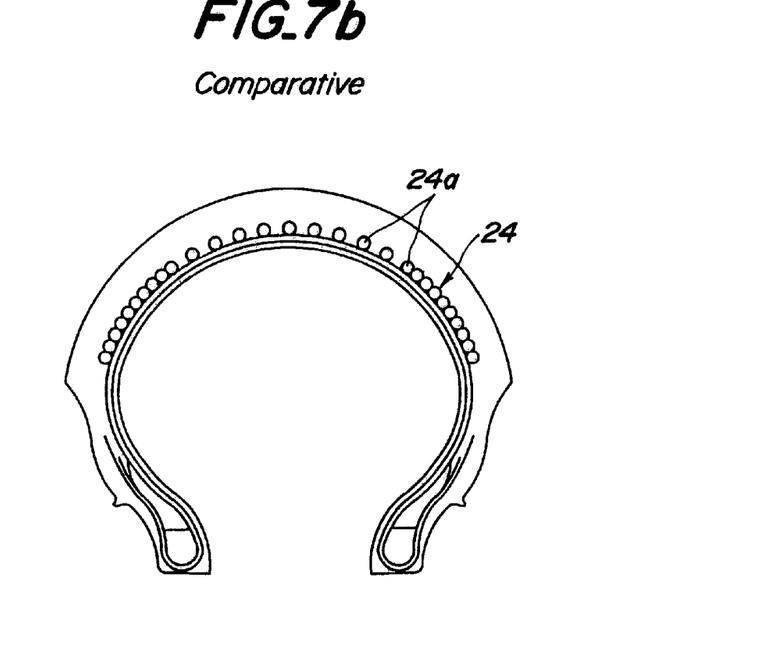
Figure 8A:
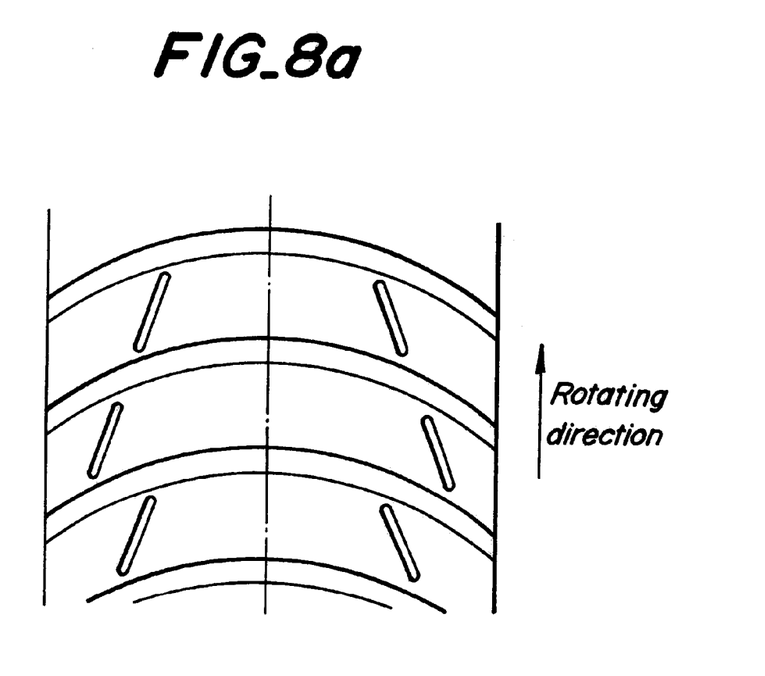
FIGS. 8a and 8b are schematic views illustrating a tread pattern and a belt structure of an embodiment of the pneumatic radial tire according to the invention, respectively.
Figure 8B:
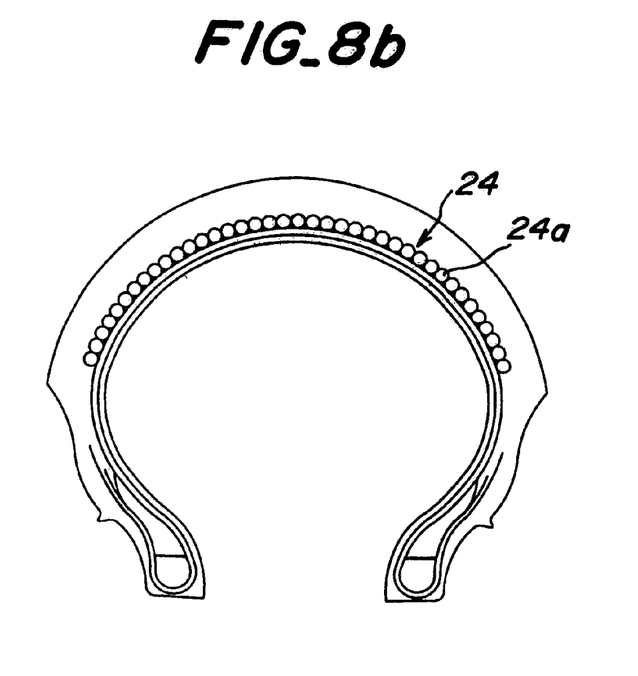
Figure 9A:
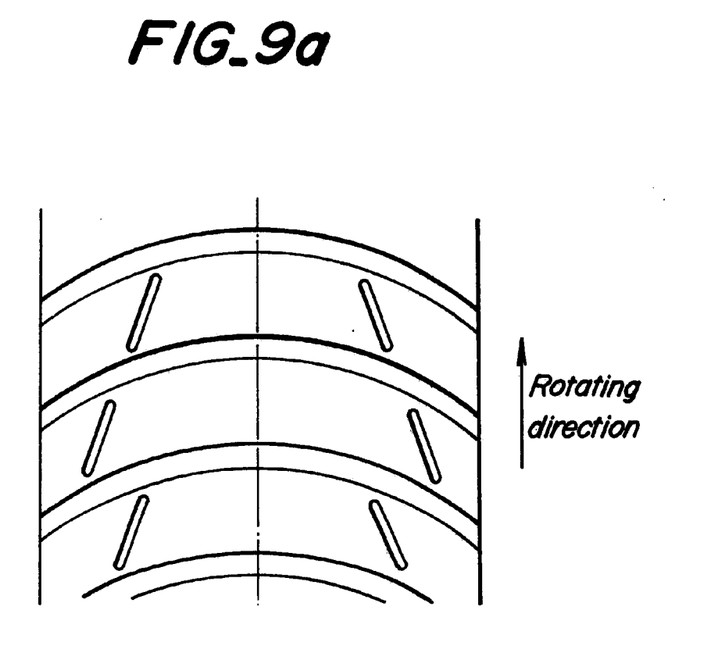
FIGS. 9a and 9b are schematic views illustrating a tread pattern and a belt structure of another embodiment of the pneumatic radial tire according to the invention, respectively.
Figure 9B:
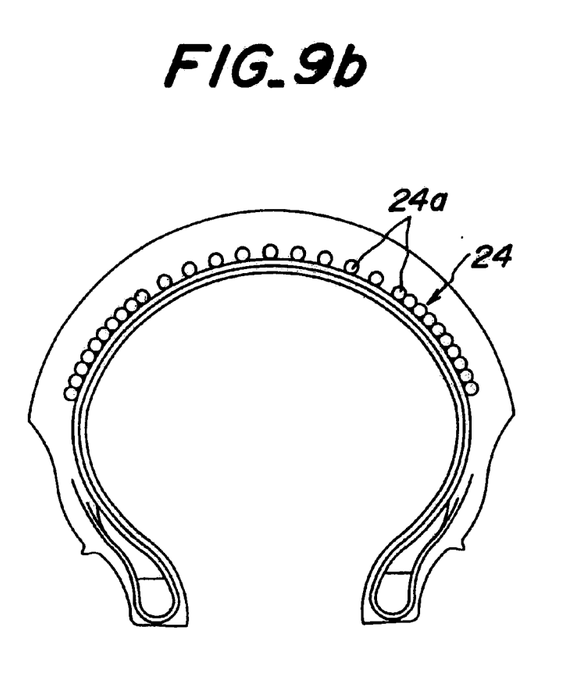

The comparative tire 1 has a tread pattern shown in FIG. 7a and a belt structure shown in FIG. 7b. The example tire 4 has a tread pattern shown in FIG. 8a and a belt structure shown in FIG. 8b. The example tire 5 has a tread pattern shown in FIG. 9a and a belt structure shown in FIG. 9b. In the belt structure of FIGS. 7b and 9b, the arranging number of the cords 24a are 42 cords/5 cm in the tread center zone and 58 cords/5 cm in the tread shoulder zone, while the arranging number of cords 24a in FIG. 8b is 50 cords/5 cm in each of the tread center zone and tread shoulder zone. In the tread pattern of FIGS. 8a and 9a, a ratio of total length of slant sub-grooves in the circumferential direction of the tread to a circumferential length of the tread is 20% in the tread center zone and 50% in the tread shoulder zone.

TABLE 3

|  | Comparative Example 1 | Example 4 | Example 5 |
|---|---|---|---|
| Dry road surface |  |  |  |
| stability (stiffness feeling) | 100 | 95 | 100 |
| quick handling | 100 | 110 | 102 |
| handle shimmy | 100 | 95 | 100 |
| Gripping property on wet road | 100 | 110 | 110 |
| Resistance to cracking at groove bottom | no trouble after running over 20,000 km | no trouble after running over 20,000 km | no trouble after running over 20,000 km |

EXAMPLES 6–7

Comparative Example 2

There are provided three pneumatic radial tires having a tire size of 120/70ZR17 for a front wheel of a motorcycle as Comparative Example 2 and Examples 6, 7. The same actual running test and drum test as in Example 1 are carried out to obtain results as shown in Table 4.

Figure 10A:
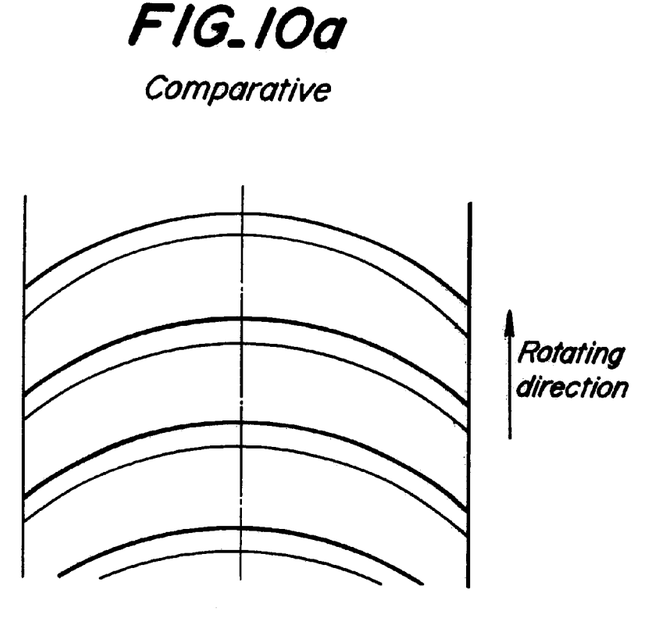
FIGS. 10a and 10b are schematic views illustrating a tread pattern and a belt structure of another comparative tire, respectively.
Figure 10B:
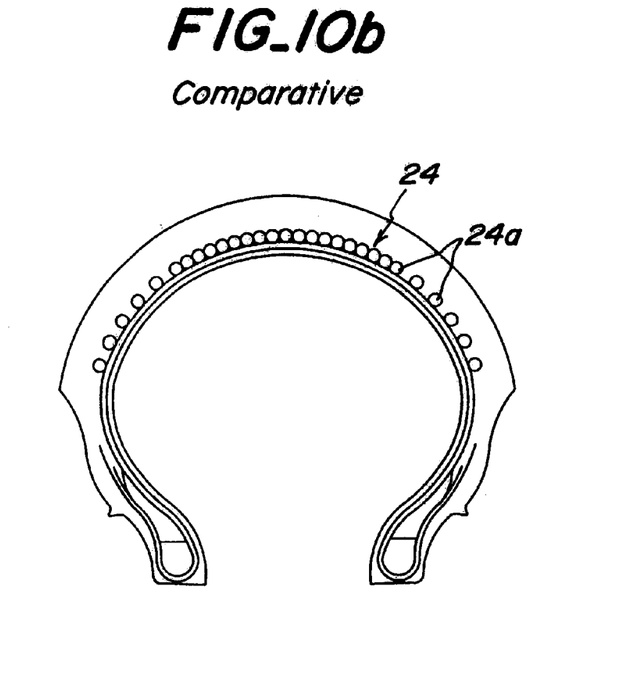
Figure 11A:
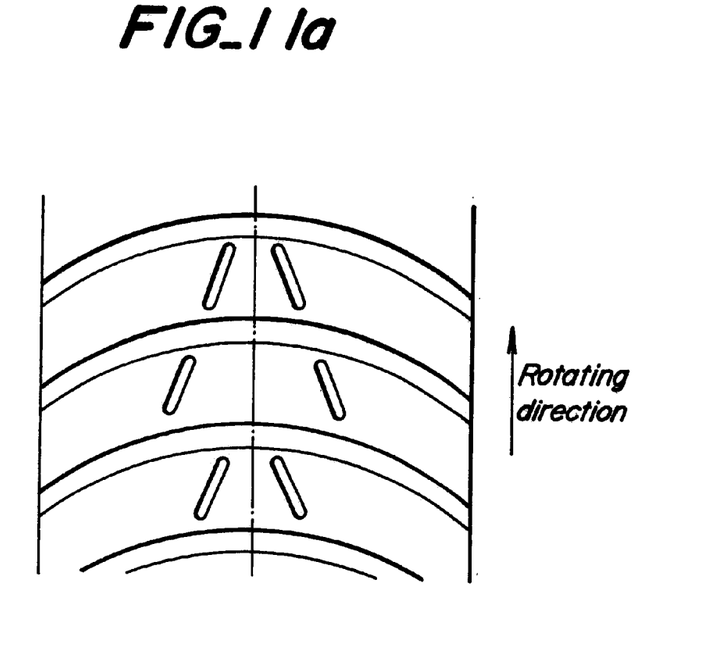
FIGS. 11a and 11b are schematic views illustrating a tread pattern and a belt structure of the other embodiment of the pneumatic radial tire according to the invention, respectively.
Figure 11B:
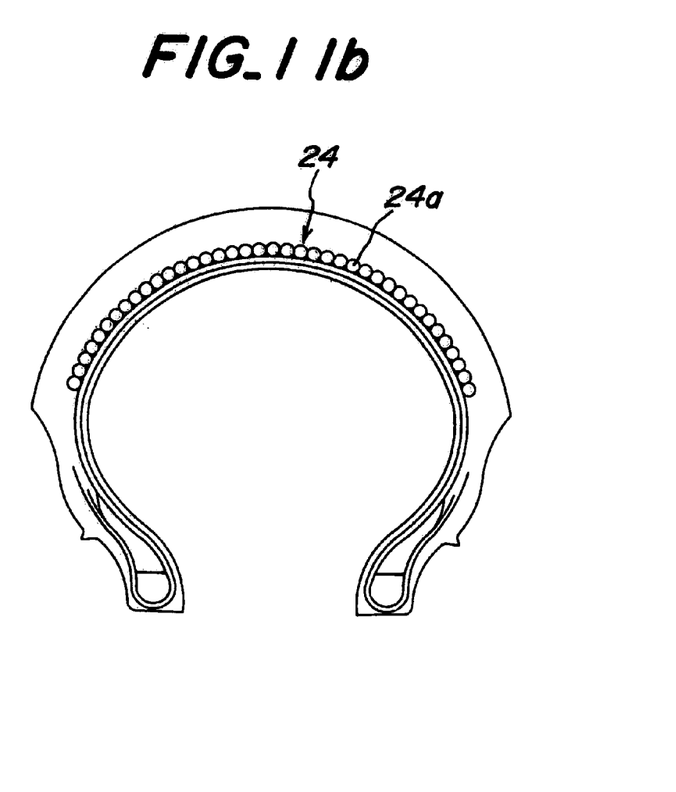
Figure 12A:
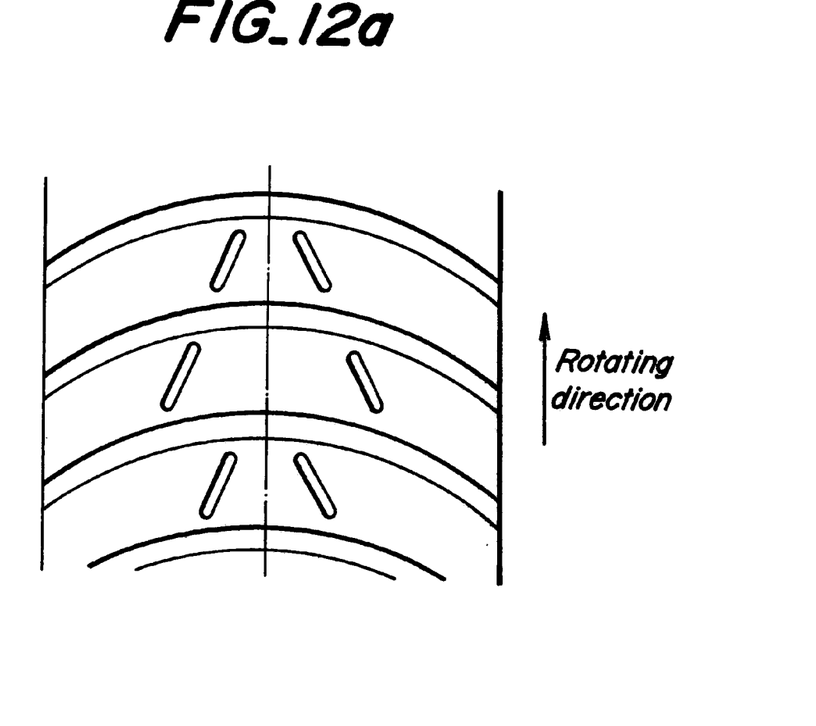
FIGS. 12a and 12b are schematic views illustrating a tread pattern and a belt structure of a further embodiment of the pneumatic radial tire according to the invention, respectively.
Figure 12B:
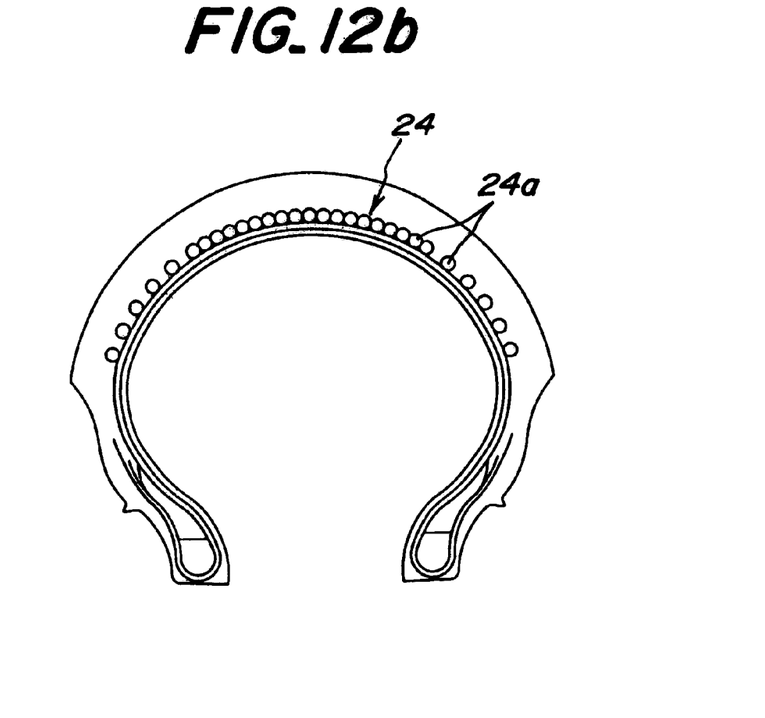

The comparative tire 2 has a tread pattern shown in FIG. 10a and a belt structure shown in FIG. 10b. The example tire 6 has a tread pattern shown in FIG. 11a and a belt structure shown in FIG. 11b. The example tire 7 has a tread pattern shown in FIG. 12a and a belt structure shown in FIG. 12b. In the belt structure of FIGS. 10b and 12b, the arranging number of the cords 24a are 58 cords/5 cm in the tread center zone and 42 cords/5 cm in the tread shoulder zone, while the arranging number of cords 24a in FIG. 11b is 50 cords/5 cm in each of the tread center zone and tread shoulder zone. In the tread pattern of FIGS. 11a and 12a, a ratio of total length of slant sub-grooves in the circumferential direction of the tread to a circumferential length of the tread is 50% in the tread center zone and 20% in the tread shoulder zone.

TABLE 4

|  | Comparative Example 2 | Example 6 | Example 7 |
|---|---|---|---|
| Dry road surface |  |  |  |
| stability (stiffness feeling) | 100 | 98 | 98 |
| quick handling | 100 | 95 | 100 |
| handle shimmy | 100 | 120 | 115 |
| Gripping property on wet road | 100 | 110 | 110 |
| Resistance to cracking at groove bottom | no trouble after running over 20,000 km | no trouble after running over 20,000 km | no trouble after running over 20,000 km |

As seen from the above, according to the invention, the occurrence of shimmy can effectively be prevented and also the gripping property on wet road can be enhanced. Particularly, the occurrence of cracking at the bottom of the slant sub-groove can sufficiently be prevented by specifying the shape of the slant sub-groove itself, while the quick handling and steering stability can be more enhanced by changing the arranging density of the cords for the belt at the tread center zone and the tread shoulder zone.

What is claimed is:

1. A pneumatic radial tire for a motorcycle comprising; a belt containing cords extended substantially in a circumferential direction of a tread, a directional tread pattern defined by main slant grooves each having an acute-side inclination angle of not less than 45° with respect to the circumferential direction of the tread and extending from a tread center or a vicinity thereof up to a tread shoulder region, and a slant sub-groove extending between the slant main grooves and having an acute-side inclination angle with respect to the circumferential direction of the tread smaller than that of the slant main groove, wherein a groove width of the slant main groove is within a range of 3–15% of a peripheral length between both ends of the tread when the tire is mounted onto a standard rim and inflated with an air pressure corresponding to 80% of a maximum air pressure with no loading; said slant sub-groove having a main portion not opening into the slant main groove; said slant sub-groove having an acute-side inclination angle of 0–30° with respect to the circumferential direction of the tread, a groove width narrower than that of the slant main groove, a length in the circumferential direction of the tread corresponding to 30–80% of an arranging pitch of the slant main grooves, and a depth corresponding to 50–100% of a depth of the slant main groove.

2. A pneumatic radial tire for a motorcycle according to claim 1, wherein the slant sub-groove is disposed on a center of the tread between the slant main grooves.

3. A pneumatic radial tire for a motorcycle according to claim 1, wherein a pair of the slant sub-grooves is arranged between the slant main grooves in symmetry with each other with respect to a center of the tread.

4. A pneumatic radial tire for a motorcycle according to claim 1, wherein the slant sub-groove comprises two discontinuous sub-groove portions arranged on the same line.

5. A pneumatic radial tire for a motorcycle according to claim 1, wherein the slant sub-groove comprises said main portion and a narrow-width and/or a shallow-depth portion extending outward from each end of the main portion and opening to the slant main groove.

6. A pneumatic radial tire for a motorcycle according to claim 1, wherein the belt is constituted by helically winding a cord or plural cords for the belt so as to extend substantially in the circumferential direction of the tread.

7. A pneumatic radial tire for motorcycle according to claim 6, wherein an arranging density of the cords for the belt is higher in a tread shoulder zone than in a tread center zone, and a total length of the slant main groove and the main portion of the slant sub-groove in the circumferential direction of the tread is longer in the tread shoulder zone than in the tread center zone.

8. A pneumatic radial tire for a motorcycle according to claim 7, wherein the slant sub-groove is disposed on a center of the tread between the slant main grooves.

9. A pneumatic radial tire for a motorcycle according to claim 7, wherein a pair of the slant sub-grooves is arranged between the slant main grooves in symmetry with each other with respect to a center of the tread.

10. A pneumatic radial tire for a motorcycle according to claim 7, wherein the slant sub-groove comprises two discontinuous sub-groove portions arranged on the same line.

11. A pneumatic radial tire for a motorcycle according to claim 7, wherein the slant sub-groove comprises said main portion and a narrow-width and/or a shallow-depth portion extending outward from each end of the main portion and opening to the slant main groove.

12. A pneumatic radial tire for a motorcycle according to claim 7, wherein the slant sub-groove comprises a narrow-width central portion and a wide-width main portion extending outward from each end of the central portion and not opening to any slant main groove.

13. A pneumatic radial tire for a motorcycle according to claim 7, wherein the slant sub-groove comprises said main portion inclined in a same direction as said slant main groove and a connected folded portion extending substantially parallel to said slant main groove.

14. A pneumatic radial tire for a motorcycle according to claim 13, wherein said folded portion has a width narrower than said main portion.

15. A pneumatic radial tire for a motorcycle according to claim 6, wherein an arranging density of the cords for the belt is higher in a tread center zone than in a tread shoulder zone, and a total length of the slant main groove and the main portion of the slant sub-groove in the circumferential direction of the tread is longer in the tread center zone than in the tread shoulder zone.

16. A pneumatic radial tire for a motorcycle according to claim 15, wherein the slant sub-groove is disposed on a center of the tread between the slant main grooves.

17. A pneumatic radial tire for a motorcycle according to claim 15, wherein a pair of the slant sub-grooves is arranged between the slant main grooves in symmetry with each other with respect to a center of the tread.

18. A pneumatic radial tire for a motorcycle according to claim 15, wherein the slant sub-groove comprises two discontinuous sub-groove portions arranged on the same line.

19. A pneumatic radial tire for a motorcycle according to claim 15, wherein the slant sub-groove comprises said main portion and a narrow-width and/or a shallow-depth portion extending outward from each end of the main portion and opening to the slant main groove.

20. A pneumatic radial tire for a motorcycle according to claim 15, wherein the slant sub-groove comprises a narrow-width central portion and a wide-width main portion extending outward from each end of the central portion and not opening to any slant main groove.

21. A pneumatic radial tire for a motorcycle according to claim 15, wherein the slant sub-groove comprises said main portion inclined in a same direction as said slant main groove and a connected folded portion extending substantially parallel to said slant main groove.

22. A pneumatic radial tire for a motorcycle according to claim 21, wherein said folded portion has a width narrower than said main portion.

23. A pneumatic radial tire for a motorcycle according to claim 1, wherein the slant sub-groove comprises a narrow-width central portion and a wide-width main portion extending outward from each end of the central portion and not opening to any slant main groove.

24. A pneumatic radial tire for a motorcycle according to claim 1, wherein the slant sub-groove comprises said main portion inclined in a same direction as said slant main groove and a connected folded portion extending substantially parallel to said slant main groove.

25. A pneumatic radial tire for a motorcycle according to claim 24, wherein said folded portion has a width narrower than said main portion.

* * * * *